United States Patent Office 3,526,607
Patented Sept. 1, 1970

3,526,607
EPOXY RESIN COMPOSITION AND PROCESS
Louise H. Brown, Santa Monica, and Ronald Swidler, Pasadena, Calif., assignors to Tallow Research, Incorporated, San Francisco, Calif., a corporation of California
No Drawing. Continuation-in-part of application Ser. No. 111,496, May 22, 1961. This application Sept. 6, 1968, Ser. No. 758,147
Int. Cl. C08g 30/14
U.S. Cl. 260—18                    10 Claims

ABSTRACT OF THE DISCLOSURE

An epoxy resin composition useful in adhesives and in electrical potting and encapsulation applications comprising a glycidyl polyether of a polyhydric organic compound and a curing agent comprising the reaction product of a polyamine and an alkylated phenol, such as hydroxyphenylene distearic acid and/or dimethyl hydroxyphenylene distearate. The equivalent ratio of polyamine to alkylated phenol is from 1:2 to 2:1. The weight ratio of polyether to curing agent is from 1:1 to 1:3.

---

This is a continuation-in-part of our copending application Ser. No. 111,496, filed May 22, 1961, the disclosure of which is incorporated herein by reference said application is now abandoned.

The epoxy resins, commercially available as uncured intermediate resins or partial polymers (polyethers of low molecular weight having terminal epoxy groups) under the trade names "Araldite" (Ciba), "Epon" (Shell), etc., in the form of viscous liquids or low melting solid polymers commonly known as "lump" resins, are not thermosetting as such, but can be converted to the infusible state by crosslinking with the aid of hardeners or curing agents.

A primary object of the present invention is to provide epoxy resin compositions embodying novel curing agents.

A further object of the present invention is to provide novel epoxy resin compositions capable of producing superior adhesives.

Another object of the present invention is to provide novel epoxy resin compositions capable of producing semi-rigid polymers having excellent electrical properties.

Another object of the present invention is to provide novel epoxy resin compositions capable of being cured in transparent, semi-rigid sheet form.

Still another object of the present invention is to provide novel polyamide curing agents for use in epoxy resin compositions.

Other objects and advantages of this invention will be more readily apparent from the following detailed description of preferred embodiments thereof.

Briefly, this invention comprehends within its scope the discovery that novel and improved epoxy resins are obtained by utilizing novel polyamide curing agents comprising the reaction products of a polyamine and an alkylated phenol selected from the group consisting of hydroxyphenyl stearic acid, hydroxyphenylene distearic acid, esters thereof and mixtures thereof. It has also been discovered that excellent epoxy curing agents are obtained by reacting a polyamine with alkylated phenols produced by treating phenol, in the presence of an acid-activated clay catalyst, with oleic acid or a derivative thereof. Such alkylated phenols, and processes for making the same, are fully disclosed in our copending application Ser. No. 111,482, filed May 22, 1961, now abandoned. As used herein and in the appended claims, the term "oleic acid derivatives" and similar terms are intended to mean and include oleic acid esters, including esters of monofunctional alcohols such as methyl oleate, esters of polyfunctional alcohols such as ethylene glycol dioleate, glycerides or glycol esters such as triolein, and fats and oils containing oleic acid, oleic acid esters of glycerides of oleic acid such as milk fat, butter, palm oil, vegetable butters, lard, soft tallows (greases), cottonseed oil, sunflowerseed oil, safflower oil, peanut oil, corn oil and olive oil.

The uncured epoxy partial polymers may be defined as a complex epoxide resin comprising a polyether derivative of a polyhydric organic compound, e.g., a polyhydric alcohol or phenol containing epoxy groups, and are disclosed in various places in the art. Among such references may be mentioned Castan U.S. Pats. 2,324,483 and 2,444,333, British Pats. 518,057 and 579,698 and U.S. Pat. 2,569,920. For the most part, these epoxy resins are based on the resinous product of reaction between an epihalogenohydrin, for example epichlorohydrin, and a phenol having at least two phenolic hydroxy groups, for example 2,2¹-bis-(para-hydroxyphenyl propane). U.S. Pats. 2,494,295, 2,500,600 and 2,511,913 also describe examples of epoxy resins which may be employed in the practice of the present invention. An excellent description of these resins is found in the book entitled "Polymeric Processes," Chapter X, "Epoxy Resins," by Salvatore S. Stivola. By reference, all of the aforementioned patents and the publication are intended to be a part of the present description of the epoxy resins used in the compositions of the present invention and for brevity, the epoxy resins will not be further described herein other than that they contain more than one ethylene oxide group, e.g., from 1 to 2 or more epoxide groups per molecule, and may be prepared by effecting reaction between a polyhydric alcohol or phenols, for example hydroquinone, resorcinol, glycerine, and condensation products of phenols with ketones, for instance 2,2-bis-(para-hydroxyphenyl propane), commonly known as bisphenol A, with epichlorohydrin, and modifications with reactive diluents, such as alkyl glycidyl, ether, phenyl glycidyl ether, butyl glycidyl ether, styrene oxide, etc. For example, the reaction of epichlorohydrin with bisphenol A may be formulated as follows:

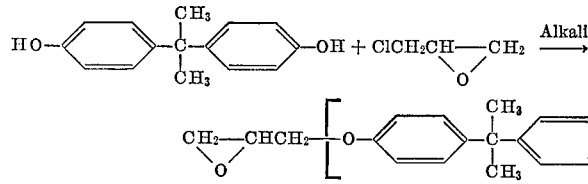
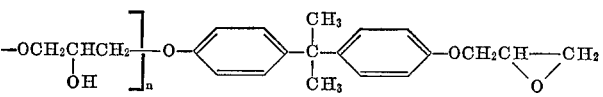

where $n$ has an average value varying from around zero to about 7.

Preferred partial epoxy polymers include "Epon" 828, "Epon" 1001, "Epon" 1004, "Epon" 1007, "Araldite" 6010 and "Bakelite" ERL 2774.

In preparing the polyamide curing agent of this invention, a polyamine such as diethylene triamine, triethylene tetraamine, tetraethylene pentaamine, hexamethylene diamine or the like is reacted with the alkylated phenol. The ratio of amine groups to phenol groups may vary over a wide range. Preferably, however, the ratio of polyamine to alkylated phenol should be in the range of about 1:2 to 2:1 equivalent proportions. Best results are normally obtained at about 1:1 equivalent proportions. Preferred alkylated phenols include hydroxyphenylene distearic acid, dimethyl hydroxyphenylene distearate, mixtures of hydroxyphenyl stearic acid and hydroxyphenylene distearic acid and mixtures of the methyl esters thereof. The polyamine and alkylated phenol can be reacted by simply mixing the same and heating the mixture to a temperature in the range of 150° C. to 200° C. for from 3 to 5 hours to produce the polyamide. The latter method produces better polyamides because none of the volatile polyamine is lost by heating.

The epoxy resin compositions of the present invention are prepared by simply mixing the epoxy and the polyamide, preferably in the presence of a small amount (between about 0.1% and 1.0% based upon the weight of the epoxy) of a catalyst such as a teritiary amine. The relative proportions of the epoxy and polyamide may vary over a wide range. In general, however, the weight ratio of polyamide to epoxy can vary from about 1:4 to 4:1 and preferably the ratio is from about 1:1 to 3:1. The compositions of the present invention are easily cured in the desired final form in the conventional manner, as by heating for a length of time and at a temperature sufficient for a cure, and this, of course, contemplates low temperature-long time cures as well as high temperature-short time cures.

The following specific examples are illustrative of the composition and methods of the present invention, but it is to be understood that the invention is not to be limited to the specific details thereof.

EXAMPLE 1

17.15 g. (0.025 mole) dimethyl hydroxyphenylene distearate and 2.91 g. (0.025 mole) hexamethylene diamine were stirred and heated under nitrogen at 150° C. for 5 hours. Heating was continued for 2 hours under vacuum (about 1 mm.). A red, viscous liquid was obtained. An infrared spectrum showed a strong amide peak at 6.07$\mu$ and a weak ester peak at 5.75$\mu$. In order to prepare an adhesive, 4 g. of the polyamide, 1.9 g. Epon 828 and 1 drop triethylamine were mixed thoroughly. This mixture was tested as an adhesive according to MIL–A5093B as follows: two 4 x 10 x 0.063 inch sheets of aluminum (Alclad 2024–T3) were degreased with acetone, then etched in a solution containing 7 parts by weight sulfuric acid, 2 parts sodium dichromate, and 17 parts water, rinsed and dried. The polymer mixture was spread on the long edges of the sheets. The sheets were clamped together to form a lap bond of 0.5 inch for the 10 inch edge. The bond was cured overnight at 110° C. The bonded sheets were cut into 1 x 7 inch strips and tested for lap shear strength. The shear strength values obtained for the strips were 1550, 1375, 1320, 1830 and 1775 pounds (average 1556 pounds). The lap shear strength of the adhesive bond was thus 1556 lbs./0.5 sq. in. or 3112 p.s.i.

EXAMPLE 2

A solution of 2.24 g. (0.0193 mole) hexamethylene diamine in 10 ml. benzene was added to a solution of 13 g. (0.0197 mole) hydroxyphenylene distearic acid in 75 ml. benzene. A viscous liquid separated. The mixture was centrifuged and the benzene decanted. The amine salt was washed three times by dissolving in hot benzene, chilling to separate the amine salt, centrifuging and decanting the benzene. The material was transferred to a flask with methanol and the methanol evaporated. Heating at 180° C. under nitrogen for 5 hours and a 1 mm. pressure for 1 hour yielded a hard, glossy polyamide. The polyamide (3.88 g.), Epon 828 (2.00 g.) and 1 drop tri-n-propylamine were mixed. The mixture, although not completely compatible, was tested as an adhesive for aluminum by the procedure described above. The lap shear strength of the adhesive bond was 2460 p.s.i.

EXAMPLE 3

In carrying out this example, a synthetic mixture of hydroxyphenyl stearic acid and hydroxyphenylene distearic acid, such mixture being equivalent to the reaction product of phenol and oleic acid in accordance with the method disclosed in Example 17 of said copending application Ser. No. 111,482, was used in forming the polyamide.

A mixture of 43 g. of hydroxyphenyl stearic acid and 14.5 g. of hydroxyphenylene distearic acid was prepared (neutral equivalent, 369). An 18.5 g. (0.05 equiv.) portion of this synthetic mixture was admixed with a solution of 2.90 g. (0.025 equiv.) of hexamethylene diamine in benzene. Upon cooling the solution, an amine salt separated. This material was repeatedly purified by precipitation from benzene. The amine salt was separated from the benzene and the residual solvent removed in vacuo leaving 21.0 g. of a red viscous oil. This oil was heated for 5 hours at 180° C. to 190° C. at ambient pressure and then for 1 additional hour under vacuum. The residual polyamide (20.5 g.) had an hydroxyl equivalent of 3.90%. An adhesive was prepared from the polyamide (3.9 g.) upon admixture with 2.0 g. Epon and 3 drops of tri-n-propylamine. The adhesive mixture was spread between aluminum plates and cured for 12 hours at 110° C. The resultant adhesive bond gave a lap shear strength of 3462 p.s.i.

EXAMPLE 4

Phenol (47 g., 0.5 mole), oleic acid (71 g., 0.25 mole), Filtrol GR 13 (22.5 g.) and water (5 g.) were placed in an Aminco rocking bomb. The bomb and contents were heated to 190° C. for 25 minutes and then quickly cooled. The contents of the bomb were dissolved in methylene chloride and the clay removed by filtration. The methylene chloride and the excess phenol were removed by steam distillation until the distillate did not give a positive test for phenol. The organic residue was extracted with benzene, washed with water and dried over sodium sulfate. The benzene was removed in vacuo. The resulting light orange oil (73 g.) had a neutralization equivalent of 386.

To 19.5 g. (0.05 equiv.) of this acid dissolved in benzene was added a benzene solution of 2.40 g. (0.05 equiv.) of hexamethylene diamine. The liquid amine salt which separated was washed with benzene and transferred to a flask fitted with a vacuum line. The salt was heated for 3 hours at ambient pressure at 180° C. to 190° C. after which time vacuum was applied for 1 hour.

The polyamide (2.8%, OH) so prepared (2.78 g.) was mixed with 2.78 g. of Epon 828 in the presence of 3 drops of tri-n-propylamine. The resulting mixture was spread onto aluminum plates and cured at 120° C. for 12 hours. The lap shear strength of these adhesive bonds was 2000 p.s.i.

EXAMPLE 5

The alkylation of phenol with oleic acid was carried out with the same proportion of reactants as in Example 4 except that the reaction was permitted to proceed for 140 minutes at 190° C. The resulting oil had a neutral equivalent of 388.

To 19.5 g. of the above acid dissolved in benzene was added a solution of 2.40 g. of hexamethylene diamine in benzene. The viscous liquid amine salt which separated was purified as in Example 4. The polyamide was prepared by heating this amine salt at 180° C. for 3 hours at ambient pressure and then for 1 hour under vacuum. The resulting polyamide (3.6%, OH), 3.9 g. was mixed with 2 g. Epon 828 and 3 drops of tri-n-propylamine. This mixture was spread onto aluminum plates to form an adhesive line and cured for 12 hours at 120° C. The lap shear strength of these adhesive bonds was 1900 p.s.i.

EXAMPLE 6

A synthetic mixture of hydroxyphenyl stearic acid (75 weight percent) and hydroxyphenylene distearic acid (about 25 weight percent) was reacted as in Example 3. That is, 18.5 g.. of the acid mixture were reacted with 2.90 g. of hexamethylene diamine in benzene to obtain a red viscous oil. This oil was heated for 5 hours at 180° C. to 190° C. at ambient pressure and then for 1 additional hour under vacuum. Adhesives were prepared from the polyamide by admixture with Epon 828 and 3 drops of tri-n-propylamine in the following proportions:

| Polyamide, grams: | Epon 828, grams: |
|---|---|
| 4.8 | 1.2 |
| 3.9 | 2.0 |
| 1.2 | 4.8 |

The polyamide-Epon tri-n-propylamine mixture was spread between aluminum plates and cured for 12 hours at 120° C. The resultant adhesive bond in each case had a lap shear strength of more than 1200 p.s.i.

Having fully described our invention, it is to be understood that we do not wish to be limited to the details set forth, but our invention is of the full scope of the appended claims.

We claim:

1. An epoxy resin composition consisting essentially of a glycidyl polyether of a polyhydric organic compound in which the polyhydric organic compound is selected from the group consisting of polyhydric alcohols and polyhydric phenols and a curing agent comprising the reaction product of a polyamine having at least two primary amine groups and an alkylated phenol selected from the group consisting of hydroxyphenylene distearic acids, dimethyl hydroxyphenylene distearates and mixtures thereof, wherein the ratio of polyamine to alkylated phenol is from about 1:2 to 2:1 equivalent proportions.

2. The composition of claim 1 wherein the ratio of polyamine to alkylated phenol is about 1:1 equivalent proportions.

3. The composition of claim 1 wherein the ratio of said polyether to said reaction product is from about 1:4 to 4:1 parts by weight.

4. A curing agent consisting essentially of the reaction product of a polyamine having at least two primary amine groups and an alkylated phenol selected from the group consisting of hydroxyphenylene distearic acids, dimethyl hydroxyphenylene distearates and mixtures thereof, wherein the ratio of polyamine to alkylated phenol is from about 1:2 to 2:1 equivalent proportions.

5. The curing agent of claim 4 wherein the ratio of polyamine to alkylated phenol is about 1:1 equivalent proportions.

6. The curing agent of claim 4 wherein the ratio of said polyether to said reaction product is from about 1:4 to 4:1 parts by weight.

7. An epoxy resin composition comprising a glycidyl polyether of a polyhydric organic compound in which the polyhydric organic compound is selected from the group consisting of polyhydric alcohols and polyhydric phenols, and a curing agent comprising the reaction product of a polyamine and an alkylated phenol selected from the group consisting of hydroxyphenyl stearic acids, alkyl hydroxyphenyl stearates, hydroxyphenylene distearic acids, dialkyl hydroxyphenylene distearates and mixtures thereof, wherein the ratio of polyamine to alkylated phenol is from about 1:2 to 2:1 equivalent proportions.

8. The composition of claim 7 wherein the ratio of polyamine to alkylated phenol is about 1:1 equivalent proportions.

9. The composition of claim 7 wherein the ratio of said polyether to said reaction product is from about 1:4 to 4:1 parts by weight.

10. An epoxy resin composition consisting essentially of a glycidyl polyether of a polyhydric organic compound in which the polyhydric organic compound is selected from the group consisting of polyhydric alcohols and polyhydric phenols, and a curing agent comprising the reaction product of a polyamine having at least two primary amine groups and an alkylated phenol selected from the group consisting of hydroxyphenylene distearic acids, dimethyl hydroxyphenylene distearates and mixtures thereof, wherein the polyamine and the alkylated phenol are reacted in approximately equal volume proportions and wherein the ratio of said polyether to said reaction product is from about 1:1 to about 1:3 parts by weight.

References Cited

UNITED STATES PATENTS

| 3,390,124 | 6/1968 | Kittridge et al. | 260—47 |
| 3,382,261 | 5/1968 | Kittredge et al. | 260—47 |

DONALD E. CZAJA, Primary Examiner

C. W. IVY, Assistant Examiner

U.S. Cl. X.R.

156—330; 161—186; 260—47, 404.5